Figure 1:
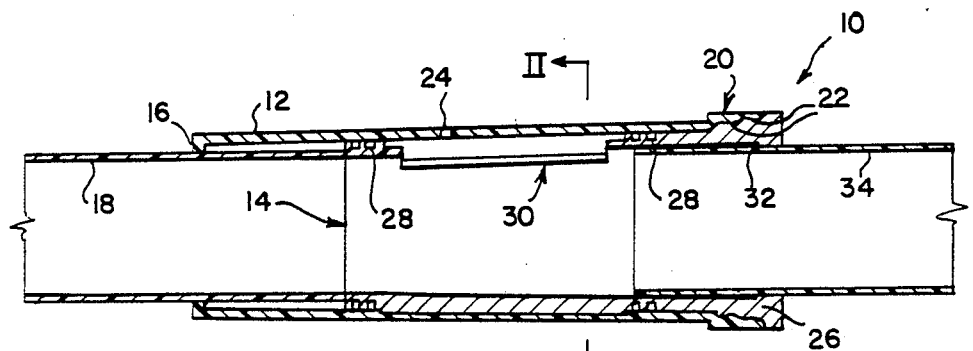

United States Patent [19]

Lazarus

[11] Patent Number: 4,971,253
[45] Date of Patent: Nov. 20, 1990

[54] PRESSURE COMPENSATING EMITTERS FOR DRIP IRRIGATION SYSTEMS

[76] Inventor: John H. Lazarus, c/o University of Cape Town, Cape Town, South Africa

[21] Appl. No.: 184,130

[22] Filed: Apr. 21, 1988

[30] Foreign Application Priority Data

Apr. 21, 1987 [ZA] South Africa ................. 87/2814

[51] Int. Cl.⁵ ................................................ B05B 1/30
[52] U.S. Cl. .................................. 239/533.1; 138/43; 239/542
[58] Field of Search ............... 239/542, 533.1; 138/42, 138/43

[56] References Cited

U.S. PATENT DOCUMENTS

| | | | |
|---|---|---|---|
| 3,851,896 | 12/1974 | Olson | 239/542 |
| 4,022,384 | 5/1977 | Hoyle et al. | 239/542 |
| 4,254,791 | 3/1981 | Bron | 239/542 |
| 4,385,727 | 5/1983 | Spencer | 239/542 |
| 4,413,786 | 11/1983 | Mehovdar | 239/542 |
| 4,533,083 | 8/1985 | Tucker | 239/542 |

FOREIGN PATENT DOCUMENTS 1439671 6/1976 United Kingdom ............... 239/542

*Primary Examiner*—Andres Kashnikow
*Assistant Examiner*—Michael J. Forman
*Attorney, Agent, or Firm*—Leydig, Voit & Mayer

[57] ABSTRACT

A cylindrical, or part cylindrical, diaphragm for a drip emitter is disclosed, the diaphragm having a depressed labyrinthine path in the outer face thereof. The path is constituted by a groove, there being one or more holes in the diaphragm which place one end of the groove in communication with the interior of the diaphragm. The diaphragm has a thinner area which forms a distortable membrane. The other end of the groove communicates with the space which lies radially outwardly of the membrane. The diaphragm is placed in a cylindrical holder which has a hole in the walling thereof. Said membrane extends over the hole in the holder.

6 Claims, 4 Drawing Sheets

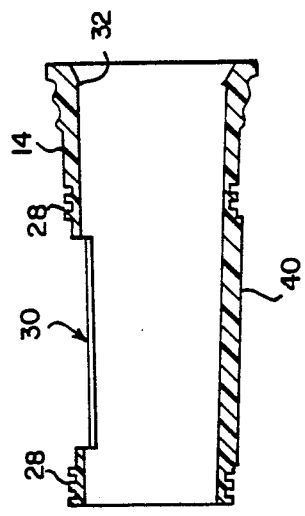
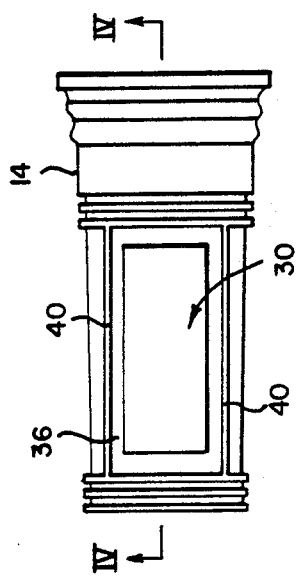
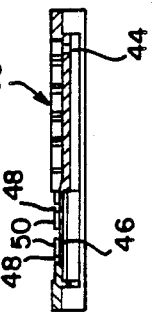
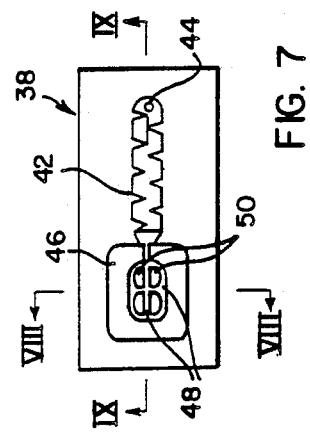

PRESSURE COMPENSATING EMITTERS FOR DRIP IRRIGATION SYSTEMS

THIS INVENTION relates to pressure compensating emitters for drip irrigation systems.

Drip emitters for irrigation systems are manufactured in a wide variety of forms. In their simplest forms the emitters comprise a restricted flow path which causes a pressure drop so that the water emerging from the dripper is at the pressure which is only slightly above atmospheric. The rate at which water emerges from such drippers is dependant to some extent on pressure, the rate of flow increasing with increasing pressure. In more sophisticated forms the flow path is progressively restricted as the pressure increases. The desired end result is that the rate at which water emerges from the emitter is largely independent of line pressure. In other words, a flat curve of flow rate against pressure is being sought.

The object of the present invention is to provide a drip emitter of the pressure compensating type which can be used 'in-line' and which is easy to manufacture.

According to the present invention there is provided a diaphragm for a pressure compensating emitter, the diaphragm being of cylindrical or part-cylindrical form and having a radially outer first face and a radially inner second face, a depressed labyrinthine path in said outer face thereof, means defining an inlet to said path at one end thereof, the diaphragm further including an area at least part of which lies radially inwardly of the surrounding parts of the first face whereby a depression is formed in said first face, said area forming a membrane which is radially outwardly distortable when water pressure is applied to the second face of the diaphragm, the other end of said path communicating with said depression.

Where the diaphragm is of part cylindrical form, said path can be of zig-zag configuration.

In a diaphragm of cylindrical form, said path can comprise a series of circumferentially extending grooves, there being at least one opening in said diaphragm, said opening forming said inlet and in use placing said one end circumferentially extending groove in communication with the supply of water under pressure, said one end circumferentially extending groove and each other circumferentially extending groove communicating with adjacent such grooves by way of axially extending grooves thereby to form said labyrinthine path, and the other end groove communicating with said depression.

According to a further aspect of the present invention there is provided a pressure compensating emitter including a holder into which a diaphragm as defined above is fitted, the holder having a hole in it through which water drips, said first face of the diaphragm being adjacent said holder and said area extending across said hole.

Figure 3:
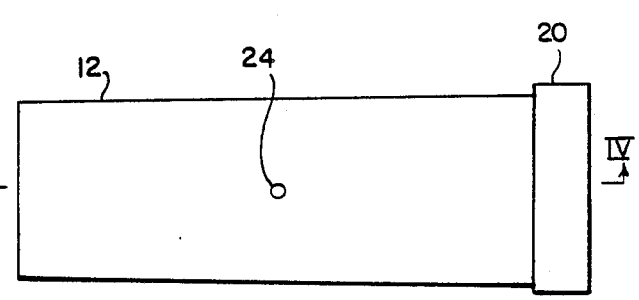
Figure 2:
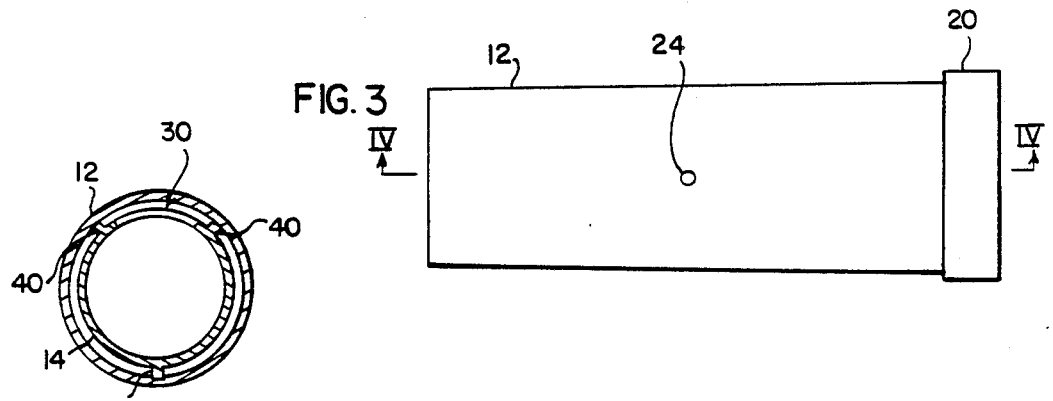
Figure 8:
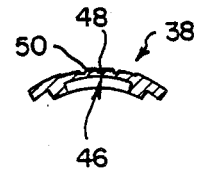
Figure 4:
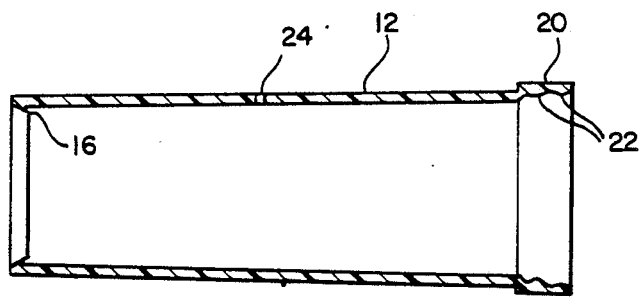
Figure 10:
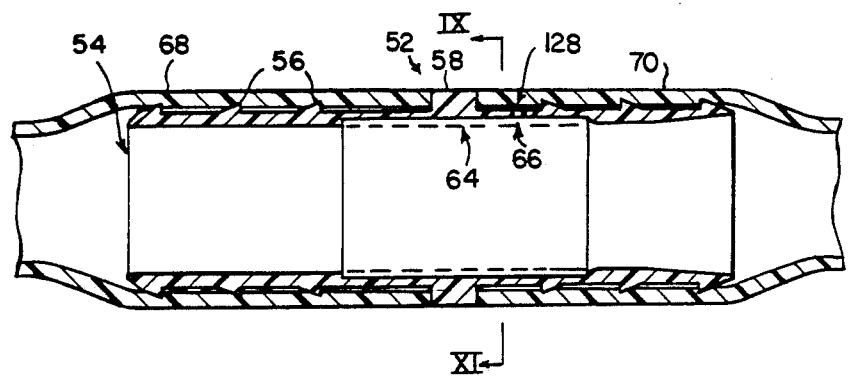
Figures 11, 15:
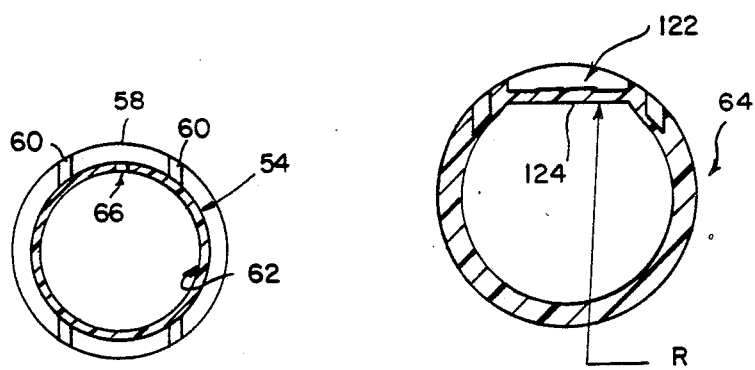
Figure 12:
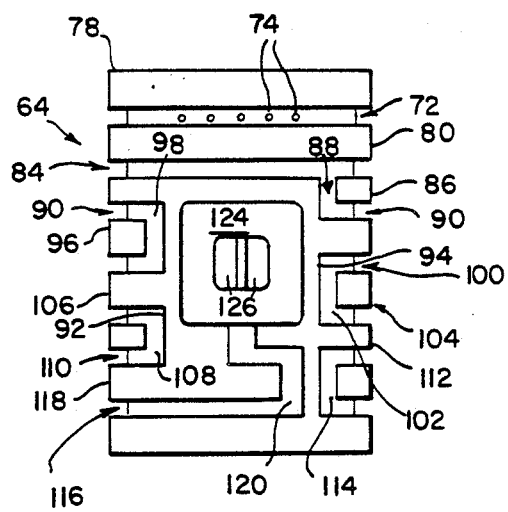
Figure 13:
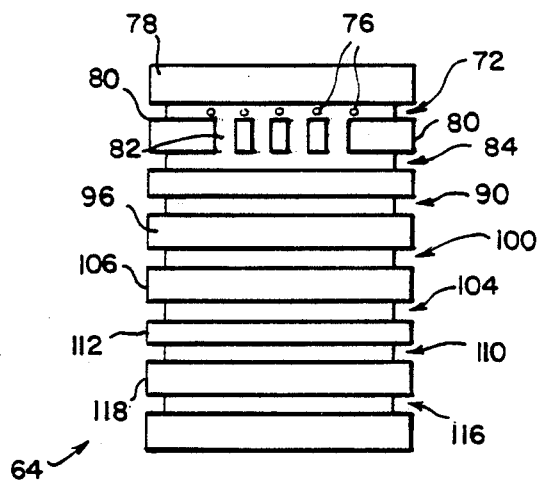
Figure 14:
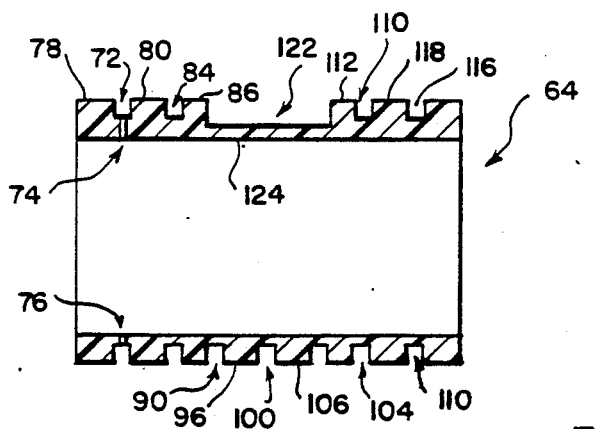

For a better understanding of the present invention, and to show how the same may be carried into effect, reference will now be made, by way of example, to the accompanying drawings in which:

FIG. 1 is an axial section through a pressure compensating emitter;
FIG. 2 is a section on the line II—II of FIG. 1;
FIG. 3 is an elevation of a sleeve of the emitter;
FIG. 4 is a section on the line IV—IV of FIG. 3;
FIG. 5 is an elevation of an insert;
FIG. 6 is a section on the line VI—VI of FIG. 5;
FIG. 7 is a plan view of a diaphragm;
FIG. 8 is a section on the line VIII—VIII of FIG. 7;
FIG. 9 is a section on the line IX—IX of FIG. 7;
FIG. 10 is an axial section through a further form of pressure compensating emitter;
FIG. 11 is a section on the line XI—XI of FIG. 10;
FIG. 12 is a top plan view of a diaphragm;
FIG. 13 is an underneath plan view of the diaphragm of FIG. 12;
FIG. 14 is an axial section through the diaphragm of FIGS. 12 and 13; and
FIG. 15 is a section on the line XV—XV of FIG. 12.

Referring firstly to FIGS. 1 and 2, the pressure compensating emitter 10 illustrated comprises a sleeve 12 and a holder 14, these components forming a casing. The sleeve 12 has an encircling barb 16 at the smaller diameter end thereof, the barb 16 penetrating the wall of a length of irrigation piping 18 which is pushed into the end of the sleeve 12. At the other end of the sleeve 12 there is a connecting formation 20 which co-operates with a corresponding formation on the holder 14. This latter formation will be described in more detail hereinafter. The formation 20 comprises a short section of increased diameter with two or more internal encircling ribs and grooves 22.

A hole 24 is provided in the wall of the sleeve 12, the hole 24 forming the outlet through which water drips from the emitter 10.

The holder 14, as best seen in FIG. 1, fits within the sleeve 12 and is inserted until its connecting formation 26 inter-engages with the connecting formation 20 of the sleeve 12. The formation 26 has external ribs and grooves which mate with the grooves and ribs 22. The holder 14 has two sealing sections 28, these being one on each side of a rectangular window 30. The holder 14 itself has an internal circumferentially extending barb 32 which penetrates the wall of a length of irrigation piping 34 which is pushed into it.

The window 30 is surrounded by a frame 36 (FIGS. 2 and 5) providing supporting and locating means for a diaphragm 38 (see FIGS. 7, 8 and 9). The holder 14 further includes external longitudinal ribs 40 (FIG. 2) which locate it centrally of the sleeve 12. The lower rib 40 slides into a groove of the sleeve 12 (see FIGS. 1 and 2).

The diaphragm 38 is of a resilient material such as rubber or a rubber-like synthetic plastics material. The diaphragm 38 is moulded with a depressed, tortuous path 42 in one face thereof, the path 42 being of zig-zag shape and forming a labyrinth. At one end of the path 42 there is a passageway 44 which passes through the diaphragm.

The diaphragm 38 includes a generally rectangular area 46 which is thinner than the remainder of the diaphragm and which constitutes a flexible membrane. The membrane has a plurality of grooves 48 in it which bound small upstanding zones 50. The path 42 and grooves 48 connect with one another.

To assemble the pressure compensating emitter 10, the diaphragm 38 is placed, with the path 42 facing outwardly, into the frame 36 so that it covers the window 30. The holder 14 is then slid into the sleeve 12 until the formations 20, 26 inter-engage. The lower rib 40 of the holder 14 ensures that the sleeve and holder can only be connected together in one position so that the area 46, upon assembly, lies across the hole 24. The sections 28 co-operate with the sleeve 12 to ensure that water can only reach the hole 24 by passing through the diaphragm 38. The pipes 18 and 34 are then pushed into opposite ends of the assembled emitter so that the emitter is now connected into the irrigation pipe.

Water under pressure within the emitter urges the diaphragm 38 outwardly against the inner face of the sleeve 12 and passes through the hole 44 and into the path 42. Because the diaphragm 38 is against the inner surface of the sleeve 12, the path 42 and the sleeve 12 define a labyrinth in which there is turbulent flow. The result is that there is a pressure drop along the path 42 between the hole 44 and the grooves 48. The pressure drop is such that, at the grooves 48, the water pressure is only sufficiently above atmospheric to cause water to drip from the hole 24.

The pressure in the irrigation line varies with distance from the inlet. As is well known, however, it is desirable for the rate of water flow from each emitter to be substantially the same as the rate of water flow from each other emitter regardless of the internal pressure to which it is subjected. In the illustrated form, the labyrinth ensures that there is a pressure drop which is sufficient to bring about substantial uniformity in flow rate through the emitters in the irrigation line. The thin, flexible membrane 46 is urged against the inner face of the sleeve 12 by pressure within the irrigation line. The higher the pressure the greater the degree to which the flexible membrane is flattened against the inner face of the sleeve 12. Thus with increasing pressure the area which the grooves 48 offer to the flowing water decreases thereby ensuring that excessive pressures in the irrigation pipe do not result in excessive rates of flow. Because of the provision of the zones 50, total closing-off of the hole 24 is not possible even if there is an excessive pressure. Water pressure acting on the diaphragm also tends to compress the diaphragm and reduce the flow area of the labyrinthine path. This also exerts some control over the rate of flow.

The area 46 can, if desired, be made smooth by omitting the grooves 48 and zones 50. In this form the inner periphery of the hole 24 has a notch in it to prevent the membrane closing-off the hole completely.

Referring now to FIG. 10, the pressure compensating emitter 52 illustrated comprises a cylindrical holder 54 which has circumferentially external barbs 56 and a circumferentially extending flange 58. One face of the flange 58 is formed with grooves 60 (FIG. 11). Internally of the holder 54 there is a cylindrical recess 62 which serves to receive a diaphragm designated 64. No details of the diaphragm have been shown in FIG. 10 and the dotted line merely indicates the position that the diaphragm occupies. There is a hole 66 in the walling of the holder 54, this placing the interior of the holder 54 in communication with the exterior thereof. Irrigation piping designated 68 and 70 is pushed onto the holder 54 until it abuts the flange 58 thereby placing the emitter 'in-line' in the irrigation piping. The barbs prevent the piping slipping off the holder.

Turning now to FIGS. 12 to 15, these illustrate the diaphragm 64 in detail. The diaphragm 64 is of generally cylindrical form and is externally grooved. A groove 72 extends around the diaphragm and there are two sets of holes 74 and 76 which pass through the diaphragm and place the groove 72 in communication with the interior of the diaphragm. These sets of holes, in use, permit water to flow from the interior of the diaphragm into the groove 72. The holes 74 and 76 could be replaced by radially outwardly opening slots which extend axially from the groove 72 to the end of the diaphragm.

Cylindrical lands 78 and 80 bound the groove 72 and there are a plurality of notches 82 in the land 80, the notches 82 placing the groove 72 in communication with the adjacent groove which is designated 84. The groove 84 also extends completely around the diaphragm and is bounded on its other side by a land 86. The land 86 is not continuous but has a gap therein, the gap forming an axially extending groove designated 88 which places the groove 84 in communication with the next circumferentially extending groove 90. The land 86 joins two axially extending lands 92 and 94. The groove 90 extends from the land 94, around the diaphragm and terminates at the land 92. A further land 96 extends from the land 94 around the diaphragm and terminates just short of the land 92. The land 96 thus forms one boundary of the groove 90. A short axially extending groove 98 places the groove 90 in communication with a further groove 100 which extends around the diaphragm to a point close to the land 94 at which point it is connected by a short axially extending groove 102 to a further circumferentially extending groove 104. There is a land 106 between the grooves 100 and 104, the land 106 merging with the land 92 and terminating short of the land 94 thereby to bound the groove 102. This pattern is repeated, the groove 104 being connected by a short axially extending groove 108 to a further circumferentially extending groove 110 and being separated from it by a land 112. The groove 110 is connected by a short axially extending groove 114 to the end circumferentially extending groove 116, the grooves 110 and 116 being separated from one another by a land designated 118. The groove 116 is connected by a return groove designated 120 to the space, designated 122 which is bounded by the lands 86, 92, 94 and 112.

Water entering the first groove 72 reaches the space 122 by flowing through the various grooves in the following order, namely, 72, 84, 88, 90, 98, 100, 102, 104, 108, 110, 114, 116, and 120. The grooves thus form a labyrinthine path.

The space 122, in addition to being bounded by the lands 86, 92, 94 and 112 is bounded by a membrane 124. The membrane is the thinnest part of the diaphragm as can clearly be seen from FIGS. 14 and 15. The underface of the diaphgram 124 is radiussed, as shown by the radius R in FIG. 15 and the central part of the diaphragm is slightly thickened to provide a multiple part raised platform 126.

In use of the emitter of FIGS. 10 to 15, water under pressure passes through the sets of holes 74 and 76 into the groove 72. It will be understood that water pressure holds the various lands against the inside face of the holder 54 so that the circumferentially extending grooves can only communicate with one another by way of the axially extending grooves. The water must consequently flow along the labyrinthine path provided to reach the space 122. The space 122 communicates, via the hole 66, with the cylindrical zone which is designated 128 in FIG. 10. From here the water flows through the grooves 60 and emerges from the emitter.

The labyrinthine path is effective to cause a pressure drop between the interior of the diaphragm and the space 122 over a range of pressures. With increasing pressure the membrane 124 is urged radially outwardly against the inner face of the holder 54 thereby progressively closing off the hole 66. Simultaneously, the labyrinthine flow path reduces in flow area. Thus, at higher pressures, the influence of the membrane on the rate of flow increases thereby ensuring that over a desired range of pressures the rate at which water emerges from the emitter is substantially unaffected by changes in water pressure.

The diaphragm 64 of FIGS. 10 etc can also be moulded into irrigation piping as the piping is extruded. In this form the diaphragm is of a stiffer material than the membrane.

What is claimed is:

1. A diaphragm for a pressure compensating emitter, the diaphragm being in the form of a sleeve and having a radially outer first face and a radially inner second face, a depressed labyrinthine path in said first face thereof, and an inlet to said path at one end of said path, the diaphragm further including an area at least part of which lies radially inwardly of the surrounding parts of said first face whereby a depression is formed in said first face, said area including a member which is radially outwardly distortable when water pressure is applied to said second face of said diaphragm, the other end of said path communicating with said depression and said area only extending around a minor portion of the circumference of the sleeve, said surrounding parts of the sleeve, measured radially, being thicker than said area and forming a frame which extends substantially entirely around said area.

2. A diaphragm according to claim 1 wherein said path has a zig-zag configuration.

3. A diaphragm according to claim 1 wherein said path comprises a plurality of circumferentially extending grooves and a plurality of axially extending grooves interconnecting said plurality of circumferentially extending grooves, and wherein said inlet comprises an opening which is formed in said diaphragm and which communicates with one of said plurality of circumferentially extending grooves.

4. A diaphragm according to claim 3 wherein the inlet comprises a plurality of holes.

5. A pressure compensating emitter comprising:
a diaphragm having an arcuate form and having a radially outer first face and a radially inner second face, a depressed labyrinthine path in said first face thereof, and an inlet to said path at one end of said path, the diaphragm further including an area at least part of which lies radially inwardly of the surrounding parts of said first face whereby a depression is formed in said first face, said area including a member which is radially outwardly distortable when water pressure is applied to said second face of said diaphragm, the other end of said path communicating with said depression, the radially outer face of said area being constituted by first and second surface portions, the second surface portions being further from the axis of said diaphragm than said first portions; and a holder into which said diaphragm is fitted, said holder having a hole in it through which water can drip, said first face of said diaphragm being adjacent said holder and said area of said diaphragm extending across said hole whereby, upon said area being urged radially outwardly by water pressure, said second portions come into contact with said holder and there are flow passages between the holder and said first portions which passages communicate with said hole.

6. A diaphragm for a pressure compensating emitter, the diaphragm being in the form of a sleeve having a cylindrical wall with opposed axial ends, the sleeve having a radially outer first face and a radially inner second face, a plurality of circumferentially extending grooves in said radially outer first face, a plurality of axially extending grooves in said radially outer first face and interconnecting said plurality of circumferentially extending grooves, the grooves forming a depressed labyrinthine path in said first face, an inlet to said path at one end of said path, an area spaced from both axial ends of said sleeve and extending circumferentially only part way around the sleeve, at least part of said area lying radially inwardly of the surrounding parts of said first face whereby a depression is formed in said first face, said area constituting a membrane which is radially outwardly distortable when water pressure is applied to said second face of the sleeve, the other end of said path communicating with said depression, the circumferentially and axially extending grooves being in the portions of said sleeve which are between said area and both axial ends of the sleeve and also in that part of the sleeve which lies circumferentially of said area.

* * * * *